Oct. 25, 1955  W. D. HOUGHTON  2,721,956
IMAGE LEVEL CONTROL SYSTEM
Filed July 2, 1951
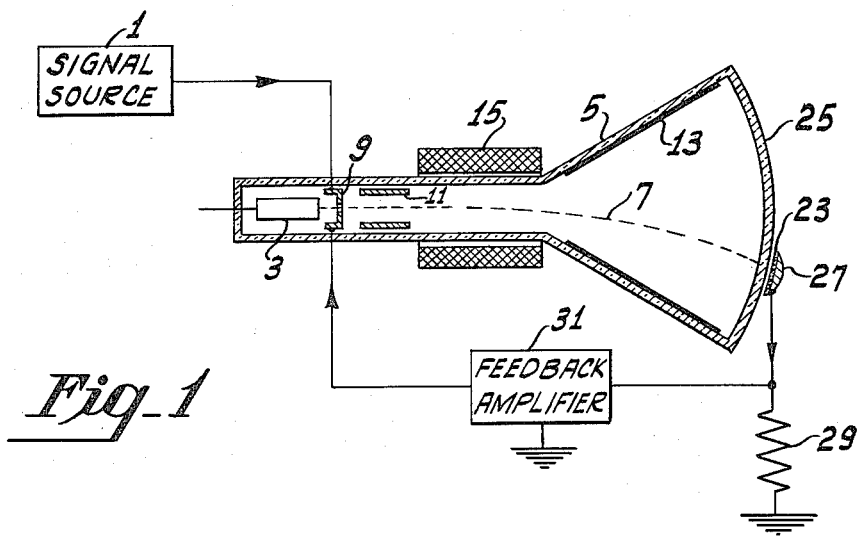
Fig_1
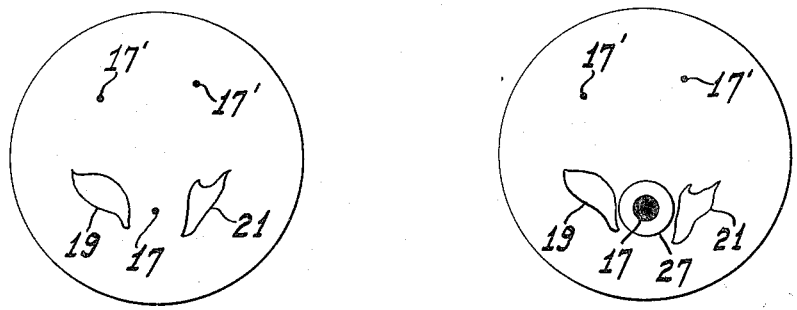
Fig_2   Fig_3
INVENTOR
William D. Houghton
BY
ATTORNEY United States Patent Office 2,721,956
Patented Oct. 25, 1955

2,721,956

IMAGE LEVEL CONTROL SYSTEM

William D. Houghton, Princeton, N. J., assignor to Radio Corporation of America, a corporation of Delaware Application July 2, 1951, Serial No. 234,758

The entire term of the patent to be granted has been disclaimed

1 Claim. (Cl. 315—22)

This invention relates generally to signal storage and/or display systems, and more particularly to means for controlling the image level of electrical data impressed upon a selected portion of the area of the target of a cathode ray device.

Previous systems, providing for either storage or direct viewing of electrical data, have generally included no practical means for selectively investigating or controlling the image level of certain recorded data to the exclusion of the remainder thereof. It may be desirable, by way of example, to inspect in detail a relatively weak signal indication of a radar target detected by a PPI radar system. In the event that the target to be inspected is near one or more wave reflecting objects providing high level signal indications, the fluorescence of the display tube screen may be such that the weak signal is overshadowed or masked by the high level signals. It then is difficult, if not impossible, to determine whether or not the desired target is stationary or moving or just what type of target it may be.

Similarly, it may be desirable to increase the image level of certain selected portions of electrical data stored within an electrical storage tube.

The present invention, as hereinafter disclosed and claimed, affords two modes of system operation wherein the image level of selected targets may be controlled. In one operational mode, the image level of desired signals is enhanced for more facility in examining a given target, while the second mode provides for diminishing the image level of certain targets which tend to obscure the image to be investigated.

It is an object of the invention to provide an improved signal storage and/or display system.

Another object of the invention is to provide a system for selectively controlling the image level of signals recorded upon a given portion of the area of a cathode ray device target screen.

A further object of the invention is to provide a system including optical magnifying means for selectively controlling the image level of signals displayed upon a given portion of the area of a cathode ray device target screen.

According to a typical embodiment of the invention, a highly conductive transparent material, for example that bearing the trade-name "nesa" (produced by the Pittsburgh Plate Glass Company), is disposed next adjacent the screen of a cathode ray device. As the cathode ray electron beam scans the portion of the image screen corresponding to the projected area of the transparent nesa, capacity currents are produced in the nesa material which are proportional to the image level of said projected area. The capacity currents generated may be fed back to a beam control electrode of the cathode ray device of proper polarity to either increase or decrease the image level of the selected displayed data.

The invention will be described in greater detail with reference to the accompanying drawing in which Fig. 1 is a schematic diagram, partially in block form, of a system according to the invention in which the image level of signals written upon a cathode ray device is selectively controlled;

Fig. 2 is a pictorial representation of a typical cathode ray tube display in which it is desirable to investigate the characteristics of a relatively weak signal next adjacent and interposed between two relatively high level signals; and Fig. 3 is a pictorial representation of the display of Fig. 2, according to the invention, in which the image level of the aforesaid weak signal is controlled.

Like reference characters are applied to like elements throughout the drawing.

Referring to Fig. 1, of the drawing, electrical data supplied by a signal source 1 is coupled to a control electrode 9 of a cathode ray display tube 5 modulating an electron beam 7 produced by the cathode electrode 3 thereof. The beam 7 is then successively controlled and accelerated by the signal electrode 9 and a plurality of accelerating electrodes 11 and 13. A suitable deflection system 15 is provided which is cooperative with the electrical data source 1.

Assuming that the signal source 1 provides PPI radar data, a typical PPI display which may be obtained is shown by Fig. 2 in which a relatively weak signal 17 is next adjacent and interposed between two relatively high level signals 19 and 21. It is apparent, when it is desirable to more closely investigate the signal indication of said weak target 17, that the fluorescence of the high level signals 19 and 21 may overshadow or mask the weaker signal 17. According to the invention, this undesirable condition is obviated by positioning a highly conductive transparent coating 23, such as nesa, next adjacent the cathode ray tube screen 25 such that the nesa material 23 subtends thereon the area to be investigated. The nesa material 23 is preferably coated upon a transparent optic member 27, for example, a glass lens.

It may be seen that as the electron beam 7 scans the target screen area subtended by the nesa coated lens, capacity currents are caused to flow in the highly conductive nesa material 23 which currents are then coupled to and develop an instantaneous voltage across a load resistor 29. The signal developed is then successively coupled to a feedback amplifier 31 and to the beam control electrode 9 referenced above. The electron beam intensity then is selectively increased when the beam 7 scans a selected area of the kinescope screen and provides an improved signal display as indicated in Fig. 3. In this mode of operation the image level of the weak signal indication 17 is both increased and optically magnified while the image level of other target indications 17', 17', 19, and 21 is unaffected. The feedback circuit time constant also may be adjusted as desired to control the image level of the area investigated.

It is apparent that the lens may be positioned over one or more high level signal indications 19 and/or 21 and the instantaneous signals obtained be applied to the above-mentioned beam control electrode 9 in blanking polarity to diminish the image level thereof. This mode of operation may be desirable for some purposes, however, the end result attained is substantially the same.

As an alternative to the use of nesa for the aforementioned conductive material, tin chloride in oil sprayed on a hot glass supporting member, upon cooling, converts to tin oxide and provides a very satisfactory transparent conductive coating. The sputtering of a microscopic metallic film on a transparent support member is also satisfactory as is a glass support member housing a fine mesh screen.

The invention has been described with reference to the investigation of a portion of the area of the cathode ray device target but it may be utilized in many other ways. For example, the conductive material may be used with an automatic target tracking system and be positioned over a selected radar target to be tracked. The aforementioned instantaneous signals developed may be applied to drive a synchro control system which maintains the lens positioned over said selected target. The invention also may be utilized in a different manner wherein a slow telegraphy modulation signal is applied to the nesa material such that a spot corresponding to a selected radar target is blinked in accordance with a predetermined code. Thus a private line communication channel may be provided between a ground control station and a given aircraft. A system which provides such a communication arrangement, in a different manner, is disclosed and claimed in a copending application filed concurrently herewith by David G. C. Luck and James L. Whittaker and entitled "Private Line Communication System."

While the invention discloses the conductive material supported by a magnifying lens, an optical magnifying support element is not necessary but may be any suitable transparent material. For situations where direct viewing is not required, as in electrical storage tube systems, the support member and conductive coating need not be transparent but may be translucent or even opaque.

What is claimed is:

In an arrangement including means for generating an electron beam, an electron beam responsive screen on which said electron beam impinges, means for deflecting said beam, and means for intensity modulating said beam in accordance with a modulating signal to produce an image on said screen including some image portions of relatively weak intensity in response to modulating signals of relatively small magnitude and some image portions of relatively high intensity in response to modulating signals of relatively large magnitude, a circuit for increasing the intensity of a given one of said image portions of weak intensity without affecting the remainder of said image comprising, in combination, an optical magnifying element of relatively small size compared with said screen positioned adjacent said one image portion; a transparent element for producing an electrical signal in response to a screen image mounted to the surface of said element adjacent said screen, and circuit means connected to receive said electrical signal and coupled to said means for intensity modulating said beam for regeneratively controlling the image level of said one image portion.

References Cited in the file of this patent

UNITED STATES PATENTS

| | | |
|---|---|---|
| 2,130,134 | Iams | Sept. 13, 1938 |
| 2,214,072 | Biedermann | Sept. 10, 1940 |
| 2,415,059 | Zworykin | Jan. 28, 1949 |
| 2,459,319 | Hansell | Jan. 18, 1949 |
| 2,461,667 | Sunstein | Feb. 15, 1949 |
| 2,468,100 | Mokowitz | Apr. 26, 1949 |
| 2,472,165 | Mankin | June 7, 1949 |
| 2,474,628 | Hurvitz | June 28, 1949 |
| 2,490,812 | Huffman | Dec. 13, 1949 |
| 2,523,328 | Ranks | Sept. 26, 1950 |
| 2,530,275 | Weingarten | Nov. 14, 1950 |
| 2,530,431 | Huffman | Nov. 21, 1950 |
| 2,545,325 | Weimer | Mar. 13, 1951 |
| 2,571,306 | Szegho | Oct. 16, 1951 |
| 2,598,941 | Roth | June 3, 1952 |
| 2,604,534 | Graham | July 23, 1952 |
| 2,642,550 | Williams | June 6, 1953 |